United States Patent [19]

Murasawa

[11] Patent Number: 5,086,336
[45] Date of Patent: Feb. 4, 1992

[54] SEMICONDUCTOR DEVICE CARD

[75] Inventor: Yasuhiro Murasawa, Itami, Japan

[73] Assignee: Mitsubishi Denki Kabushiki Kaisha, Japan

[21] Appl. No.: 516,127

[22] Filed: Apr. 27, 1990

[51] Int. Cl.$^5$ ............ H01L 23/02; H01L 23/12; H01L 23/16; G06K 19/06
[52] U.S. Cl. ............ 357/74; 357/75; 357/80; 357/79; 235/491; 235/492
[58] Field of Search ............ 357/74, 75, 79, 80; 235/491, 492, 441

[56] References Cited

U.S. PATENT DOCUMENTS

| | | | |
|---|---|---|---|
| 4,780,793 | 10/1988 | Ohtsuki | 235/492 |
| 4,798,946 | 1/1989 | Fujii et al. | 235/492 |
| 4,868,713 | 9/1989 | Banjo et al. | 235/492 |
| 4,868,714 | 9/1989 | Banjo et al. | 361/395 |
| 4,924,076 | 5/1990 | Kitamura | 235/492 |
| 4,933,540 | 6/1990 | Omori et al. | 235/441 |

Primary Examiner—Andrew J. James
Assistant Examiner—Carl Whitehead, Jr
Attorney, Agent, or Firm—Leydig, Voit & Mayer

[57] ABSTRACT

A semiconductor device card includes a frame on which a semiconductor module may be mounted and a protection panel adhered to the frame. The frame includes pairs of offset grooves along each of two opposed sides and the protection panel includes pairs of offset flanges along each of two opposed edges of the panel. The protection panel flanges are inserted into the grooves in the frame and adhered to the frame in the grooves. Thus, a large attached area for ensuring good adhesive strength between the frame and the protection panel is achieved.

3 Claims, 5 Drawing Sheets

SEMICONDUCTOR DEVICE CARD

BACKGROUND OF THE INVENTION

1. Field of the Invention

The present invention relates to a semiconductor device card such as an IC card used for a game card, an industrial memory card, or the like and, more particularly, to an improvement in the structure of protection panels provided on top and bottom surfaces of the semiconductor device card.

2. Description of the Background Art

FIG. 1A is a perspective view showing a conventional semiconductor device card which is used for a game card for recording the computer program of a television game, a memory card for a microcomputer, and the like. Referring to FIG. 1A, a semiconductor device card 1 comprises a frame 2 in which the printed board of a semiconductor module (not shown) is mounted. A number of electrode terminals 3 are provided at the front end of the card 1 as shown in FIG. 1B. These electrode terminals 3 are covered with a shutter 4 as shown in FIG. 1A. The shutter 4 is urged toward the front end of the card 1 by means of a shutter spring (not shown). Top and bottom surfaces of the card are covered with protection panels 5. The panels 5 are attached to the frame 2 with an adhesive.

When the card 1 is inserted in a connector of a card reader (not shown), shutter receiving pins 6 provided in the charging hole touch bent-down projections 7 provided at the front end of the shutter 4 and push the shutter 4 toward the rear end of the card 1 against the tension of the shutter spring, as shown in FIG. 1B. Thus, the electrode terminals 3 are exposed to contact with contact shoes of the connector so that the semiconductor module in the card 1 is electrically connected with the external card reader. Thus, data communication is carried out between the card 1 and the card reader.

To attach the protection panel 5 to the frame 2, the panel 5 include with an attaching portion 8 at the periphery on which adhesive is provided, as shown in FIG. 2. The attaching portion 8 cannot have a large area. Therefore, there is a problem that it is difficult to ensure sufficient adhesive strength between the frame 2 and the protection panel 5. Further, the protection panel 5 is weak since it is formed by a flat plate.

SUMMARY OF THE INVENTION

A semiconductor device card according to the present invention comprises a frame in which board of a semiconductor module is mounted, the frame having a trench, and a protection panel attached on the frame, the protection panel having a bent-down to flange for insertion into the peripheral frame trench of the frame in a periphery thereof.

Accordingly, it is an object of the present invention to provide a semiconductor device card having a protection panel which is strong wherein it is easy to ensure sufficient adhesive strength between a frame and the protection panel.

These and other objects, features, aspects, and advantages of the present invention will become more apparent from the following detailed description of the present invention when taken in conjunction with the accompanying drawings.

DETAILED DESCRIPTION OF THE PREFERRED EMBODIMENT

Figure 3A:
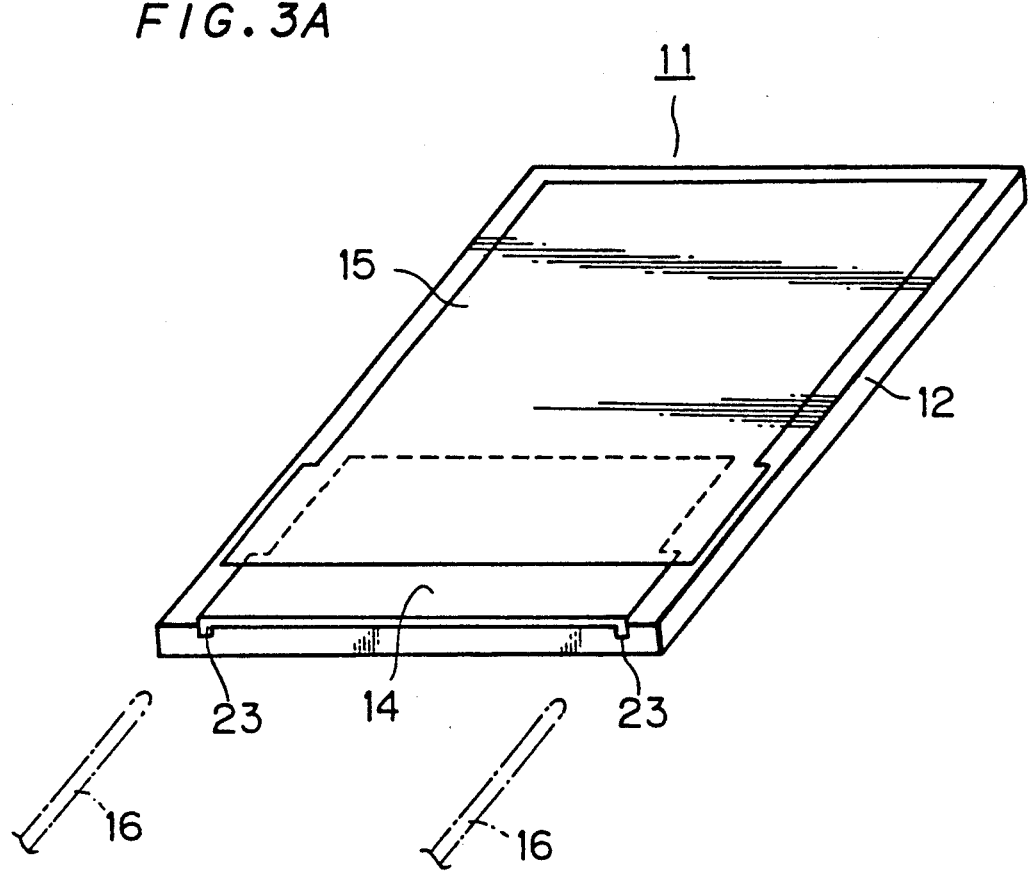
Figure 4A:
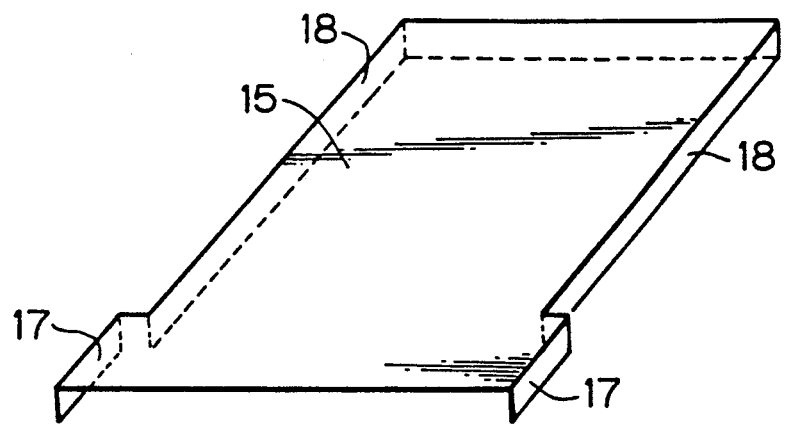
Figure 4B:
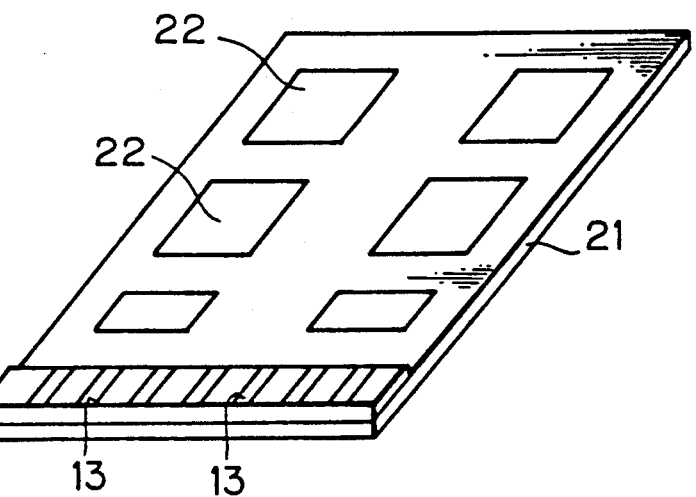
Figure 4C:
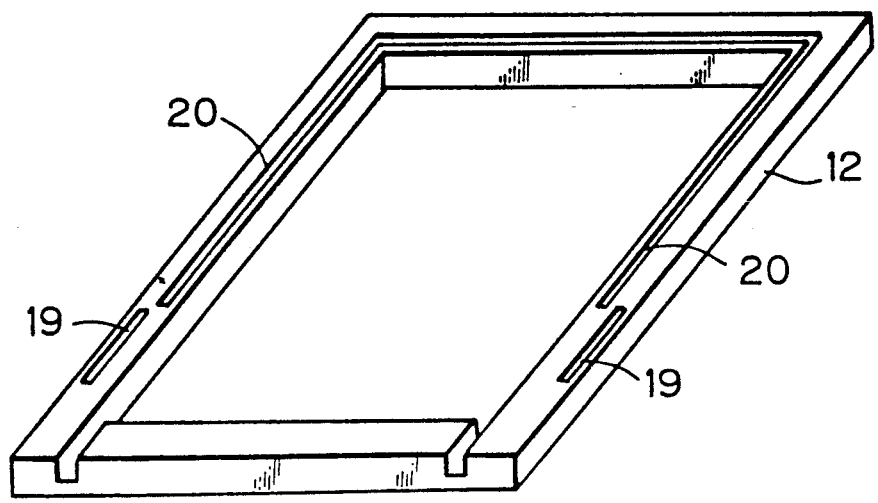

FIG. 3A is a perspective view showing an embodiment of a semiconductor device card according to the present invention and FIGS. 4A, 4B to FIG. 4C are exploded views of the semiconductor device card. Referring to these figures, a semiconductor device card 11 comprises a frame 12. There is mounted in the frame 12 a printed board 21 including a semiconductor module comprising a plurality of ICs 22. A number of electrode terminals 13 electrically connected with the semiconductor module are provided on the surface of the board 21 at the front end of the card 11. When the card 21 is not used, the electrode terminals 13 are covered by a shutter 14 formed by a metal thin plate, for example, as shown in FIG. 3A. The shutter 14 is urged toward the front end of the card 11 by means of a shutter spring (not shown). The shutter 14 is deleted in the exploded views of FIGS. 4A, 4B, 4C.

Top and rear surfaces of the card 11 are covered by electrically conducting protection panels 15, such as metal. Only the top protection panel 15 is shown in the drawings. The top and bottom protection panels 15 are attached to the frame 12 by an of adhesive.

Figure 1A:
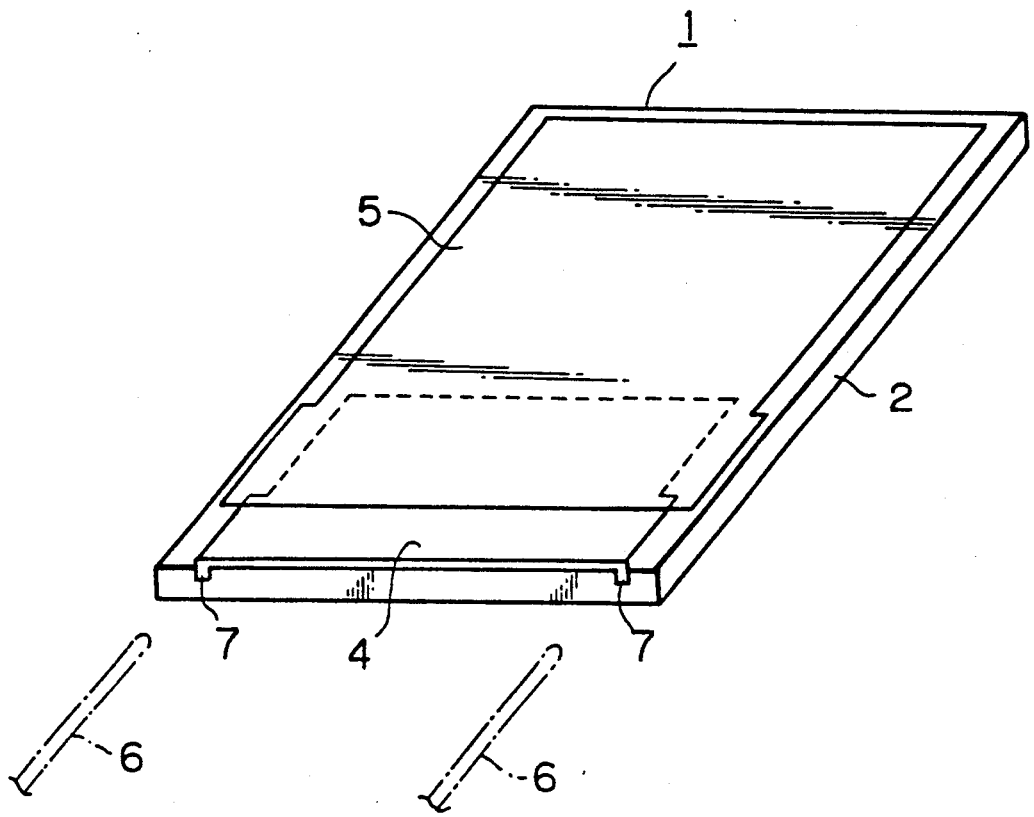
FIG. 1A and FIG. 1B are views showing a conventional semiconductor device card.
Figure 1B:
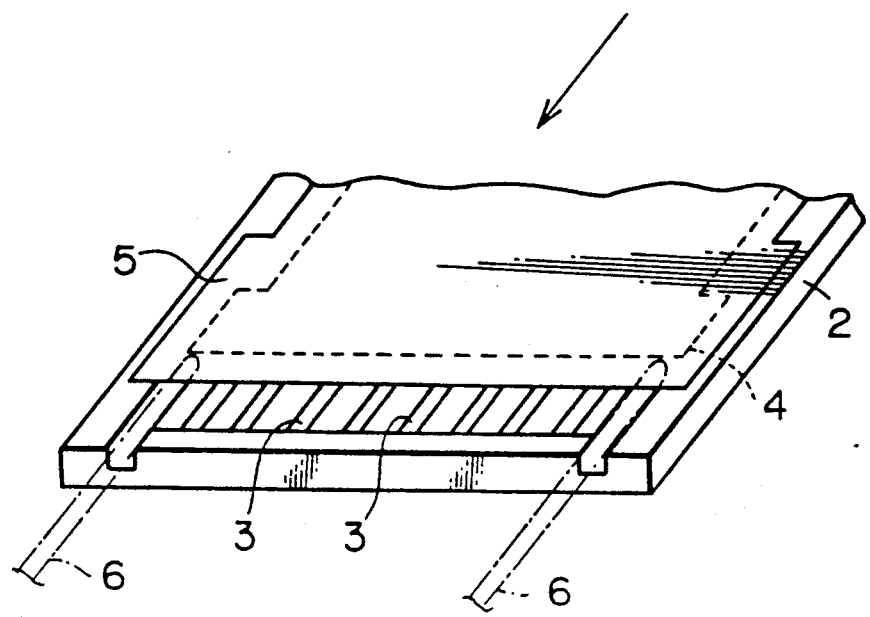
Figure 2:
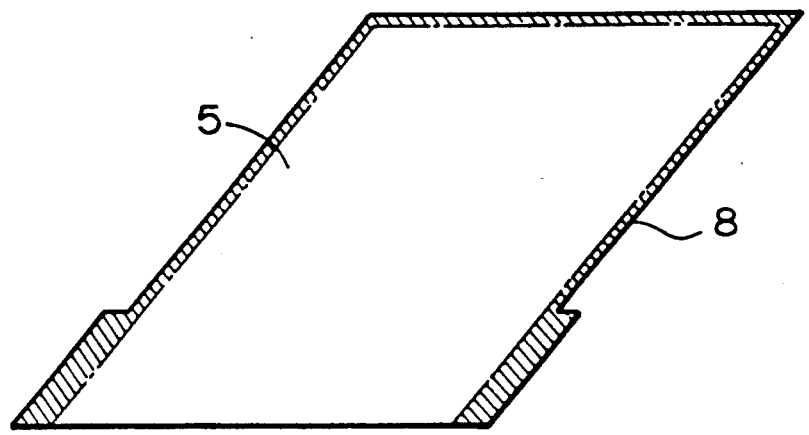
FIG. 2 is a view showing a protection panel of the conventional semiconductor device card.
Figure 5:
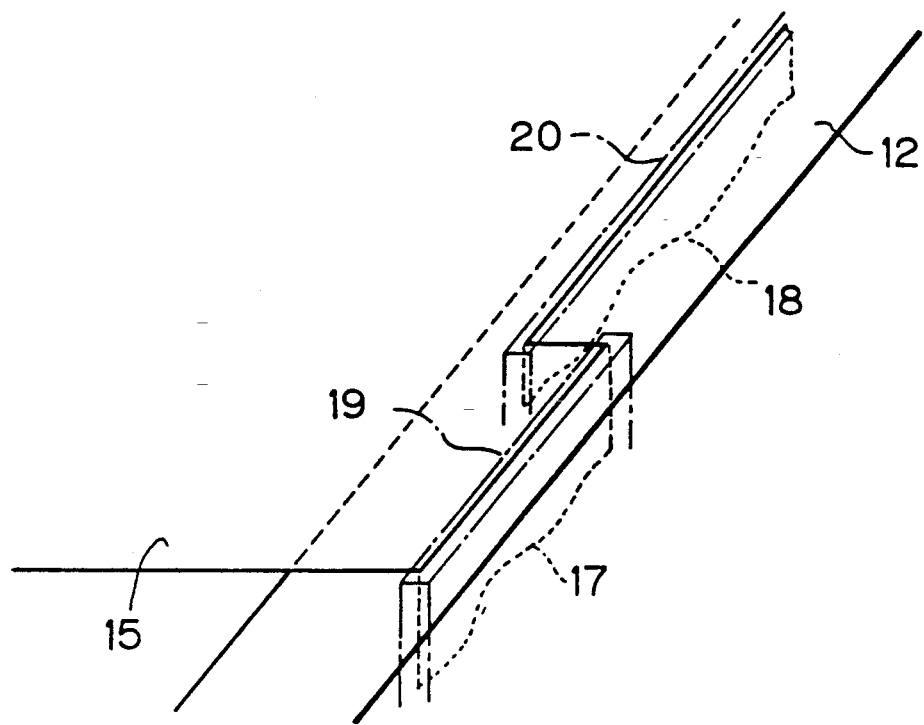
FIG. 3A, FIG. 3B, FIG. 4A, FIG. 4B to FIG. 4C, and FIG. 5 are views showing an embodiment of a semiconductor device card according to the present invention.

The protection panel 15 has first and second bent-down portions 17 and 18 in its periphery as shown in FIG. 4A. The frame 12 is provided with first and second trenches 19 and 20 as shown in FIG. 4C. In assembling the card 11, the first and second bent-down flanges 17 and 18 of the protection panel 15 are inserted into the first and second trenches 19 and 20 of the frame 12, respectively, as shown in FIG. 5. The adhesive to attach the protection panel 15 to the frame 12 can be provided not only on an attaching portion 8 (see FIG. 2) in the peripheral portion of the protection panel 15 but also on the first and second bent-down flanges 17 and 18. Therefore, it is easy to ensure sufficient attaching area to ensure sufficient adhesive strength between the frame 2 and the protection panel 15. Further, the protection panel 15 is strong in its mechanical strength since it has the bent-down flanges 17 and 18.

Figure 3B:
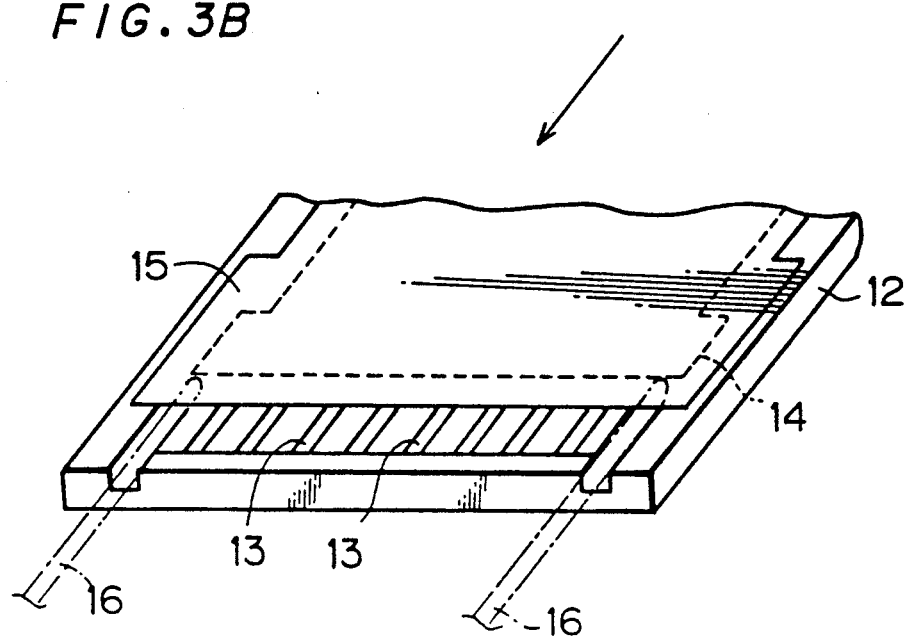

When the card 11 is not used, the shutter 14 is kept in a closed position by the tension of the shutter spring (not shown). When the card 11 is inserted in a connector of a card reader (not shown), shutter receiving pins 16 provided in the connector touch bent-down flanges 23 provided at the front end of the shutter 14 and push the shutter 14 toward the rear end of the card 11 against the tension of the shutter spring, as shown in FIG. 3B. Thus, the electrode terminals 13 are exposed to contact shoes of the connector. Thus, the semiconductor module in the card 11 is electrically connected with the external card reader. Thus, data communication can be carried out between the card 11 and the card reader.

Figure 6:
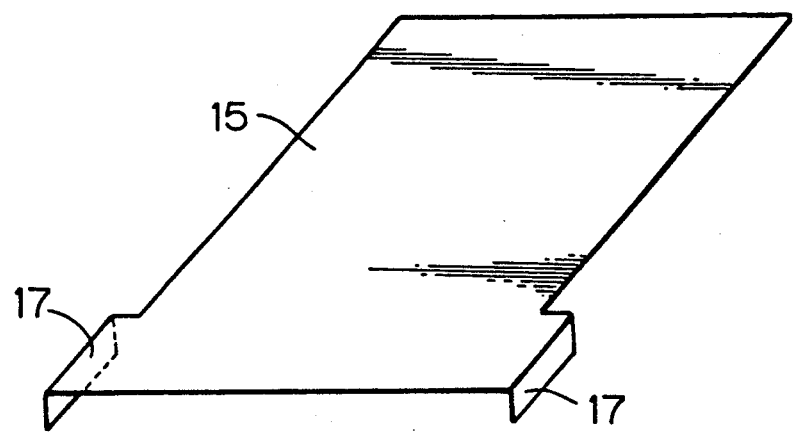
FIG. 6 is a view showing a protection panel of a semiconductor device card according to another embodiment of the present invention.
Figure 7:
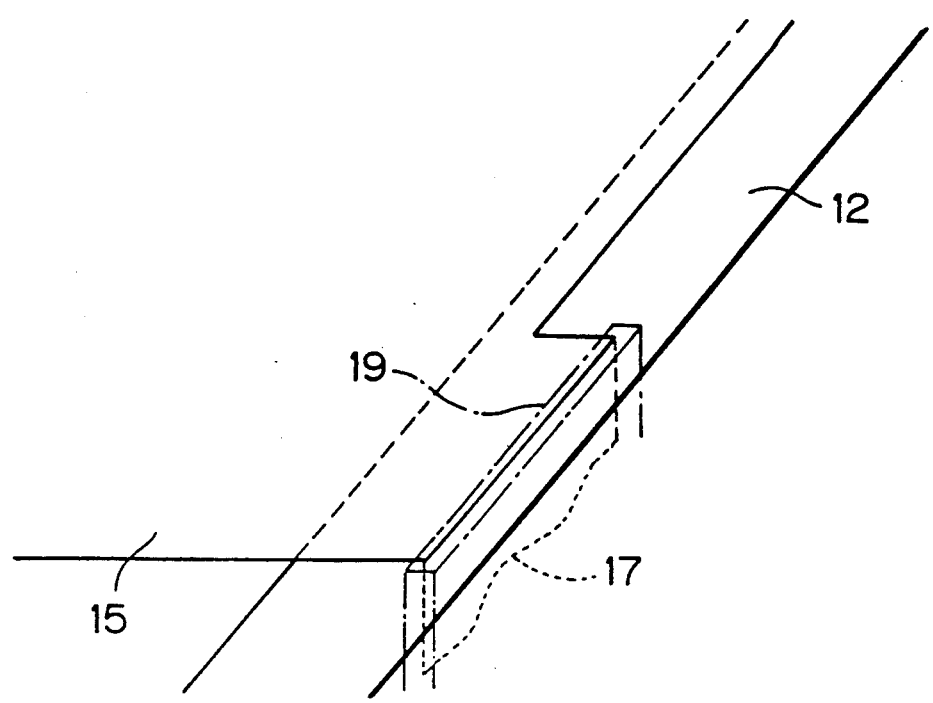
FIG. 7 is a fragmentary view showing the attachment of the protection panel of FIG. 6 to the frame of a semiconductor device card.

In a semiconductor device card of a card-edge type, adhesive strength between a frame 12 and a protection panel 15 is weak particularly in the front end portion of the card since a shutter 15 is opened and closed in this portion. In such a semiconductor device card, the protection panel 15 may have only first bent-down flanges 17 at both sides in the front end thereof, as shown in FIG. 6, to ensure sufficient adhesive strength between the frame 12 and the protection panel 15 in the front end portion of the card. In this case, the frame 12 is provided with only a first trench 19 into which the first bent-down flange 17 of the protection panel 15 is inserted as shown in FIG. 7.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. A semiconductor device card comprising:
   a four sided frame defining an area and in which a semiconductor module board may be mounted, the frame including first and second opposed sides and third and fourth opposed sided, the first and second sides each including a first groove and a second groove offset from the first groove; and
   a metal protection panel fixedly adhered to the frame, said metal protection panel having opposed first and second longitudinal edges, each edge including a first and second flange, the first and second flanges being offset from each other, wherein the first and second flanges at the first longitudinal edge of the metal protection panel are respectively inserted into the first and second grooves in the first side of the frame and the first and second flanges at the second longitudinal edge of the metal protection panel are respectively inserted into the first and second grooves in the second side of the frame and the flanges are adhered to the frame in the grooves with the protection panel covering the area.

2. The semiconductor device card in accordance with claim 1 wherein the third side of the frame includes a third groove and the first grooves in the first and second sides of the frame are continuous with each other through the third groove.

3. The semiconductor device card in accordance with claim 2 wherein the metal protection panel includes a flange transverse to the first flanges, inserted in the third groove in the frame, and adhered to the frame in the third groove.

* * * * *

UNITED STATES PATENT AND TRADEMARK OFFICE
CERTIFICATE OF CORRECTION

PATENT NO.  : 5,086,336
DATED       : FEBRUARY 4, 1992
INVENTOR(S) : YASUHIRO MURASAWA

It is certified that error appears in the above-identified patent and that said Letters Patent is hereby corrected as shown below:

Claim 1, column 3, line 28, change "sided" to --sides--.

Signed and Sealed this

Thirteenth Day of April, 1993

Attest:

STEPHEN G. KUNIN

*Attesting Officer*    *Acting Commissioner of Patents and Trademarks*